United States Patent
Steiger

(10) Patent No.: US 6,493,490 B1
(45) Date of Patent: Dec. 10, 2002

(54) METHOD AND APPARATUS FOR RECEIVING AND ALIGNING AN OPTICAL COMMUNICATIONS BEAM WITH AN INTEGRATED

(75) Inventor: Ronald D. Steiger, Redmond, WA (US)

(73) Assignee: Terabeam Corporation, Kirkland, WA (US)

( * ) Notice: Subject to any disclaimer, the term of this patent is extended or adjusted under 35 U.S.C. 154(b) by 65 days.

(21) Appl. No.: 09/740,282

(22) Filed: Dec. 18, 2000

(51) Int. Cl.[7] ................................. G02B 6/42
(52) U.S. Cl. ..................... 385/52; 385/39; 356/400
(58) Field of Search ..................... 385/30, 39, 52, 385/15, 48–49; 356/399–400; 250/227.14, 227.28

(56) References Cited

U.S. PATENT DOCUMENTS

| | | | | |
|---|---|---|---|---|
| 3,723,013 A | * | 3/1973 | Stirland | 356/152 |
| 3,918,814 A | * | 11/1975 | Weiser | 356/156 |
| 4,978,190 A | | 12/1990 | Veith | |
| 5,168,321 A | * | 12/1992 | Gregory et al. | 356/152 |
| 5,216,729 A | * | 6/1993 | Berger et al. | 385/31 |
| 5,349,176 A | * | 9/1994 | Czichy | 250/206.2 |
| 5,991,027 A | | 11/1999 | Jacobs-Cook | |

* cited by examiner

Primary Examiner—Akm E. Ullah
Assistant Examiner—Jerry T. Rahll
(74) Attorney, Agent, or Firm—Blakely Sokoloff Taylor & Zafman LLP

(57) ABSTRACT

An integrated optical communications receiver/alignment system and method. In one embodiment, a method and an apparatus are disclosed in which a semiconductor substrate includes a plurality of outer optical detectors disposed in the substrate. An optically transparent center region such as for example an optical waveguide or an optical fiber is integrated in the semiconductor substrate in a central location relative to the plurality of outer optical detectors. The optically transparent center region is optically coupled to receive an optical communications beam and the plurality of outer optical detectors are employed for alignment and/or tracking purposes.

37 Claims, 3 Drawing Sheets

METHOD AND APPARATUS FOR RECEIVING AND ALIGNING AN OPTICAL COMMUNICATIONS BEAM WITH AN INTEGRATED

BACKGROUND OF THE INVENTION

1. Field of the Invention

The present invention relates generally to wireless communications and, more specifically, the present invention relates to free-space optical communications systems.

2. Background Information

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free space and therefore do not require the routing of cables or fibers between locations. Thus, wireless optical communications are also known as free space or atmospheric optical communications. For instance, in a free space optical communications system, a beam of light is directed through free space from a transmitter at a first location to a receiver at a second location. Data or information is encoded into the beam of light, and therefore, the information is transmitted through free space from the first location to the second location.

An important aspect of a free space optical communications system is tracking. In particular, it is important that the optical communications beam (e.g. laser beam) is aligned properly between the transmitter at the first location and the receiver at the second location. For example, assume that a transmitter is mounted on a first building and that a receiver is mounted on a different second building. It is important for the transmitter on the first building to be configured to accurately direct or aim the optical communications beam at the receiver on the second building.

Tracking is utilized for maintaining the alignment of the optical communications beam between the transmitter and receiver in various situations or disturbances. Examples of these various situations or disturbances include the swaying of the buildings due to for example windy conditions, vibration of the platforms on which the transmitter and/or receiver are mounted, atmosphere induced beam steering, etc. If the tracking system is unable to compensate for disturbances, the optical communications beam is no longer properly aimed at the receiver and, consequently, communications between the transmitter and receiver are lost or impaired.

SUMMARY OF THE INVENTION

According to an aspect of the invention, a method and an apparatus are disclosed in which a semiconductor substrate includes a plurality of outer optical detectors disposed in the substrate. An optically transparent center region is integrated in the semiconductor substrate in a central location relative to the plurality of outer optical detectors. The optically transparent center region is optically coupled to receive an optical communications beam. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

Figure 1:
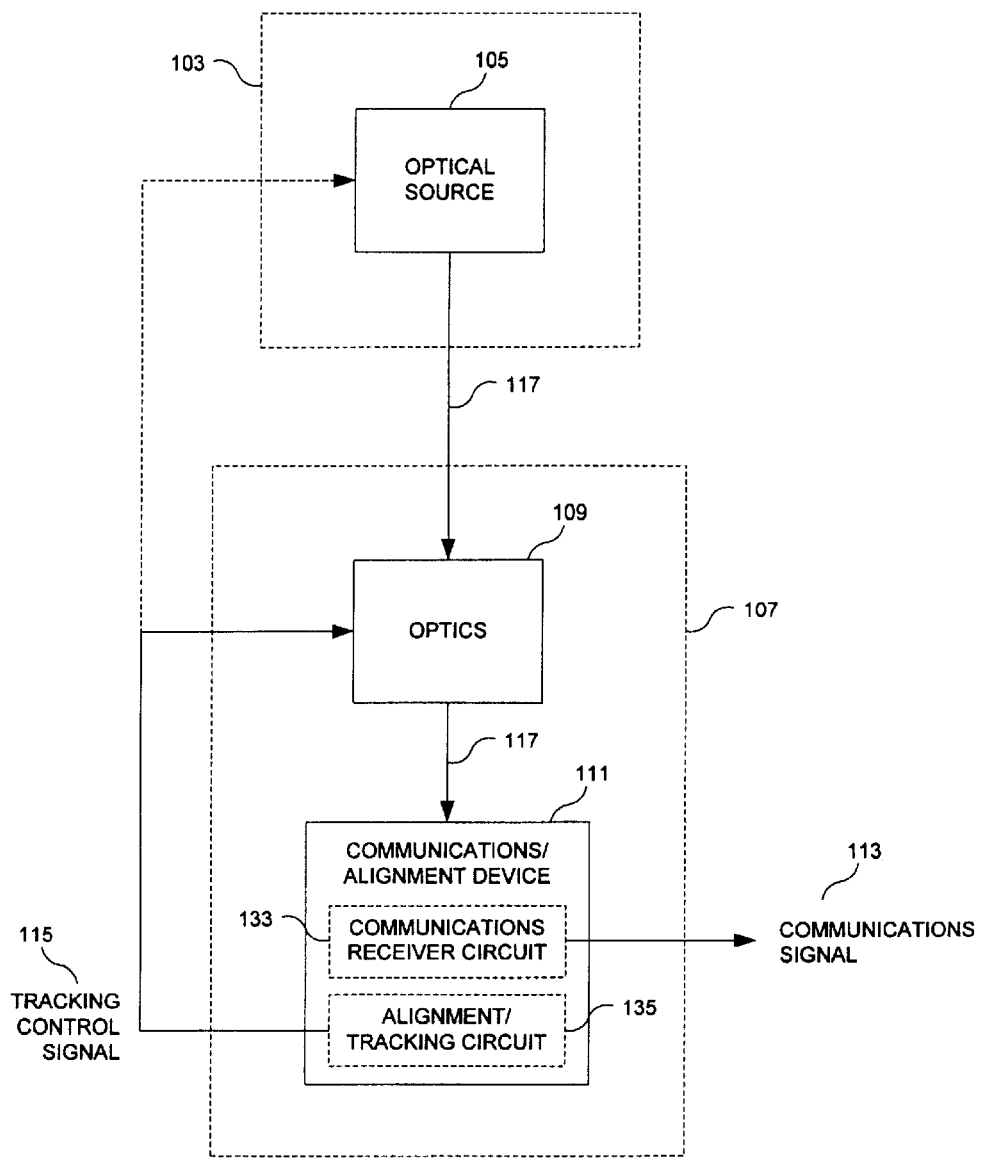
FIG. 1 is a block diagram illustrating one embodiment of an optical communications system in accordance with the teachings of the present invention.

In one aspect of the present invention, methods and apparatuses for receiving and aligning an optical communications beam with an integrated structure are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one example embodiment of the present invention, point to point free space optical communications are provided from a transmitter to a receiver. The transmitter and receiver may be located at the same location or at different locations such as on different buildings within a line of sight of each other. In one embodiment, the line of sight may include reflections off one or more reflective surfaces between the transmitter and receiver in accordance with the teachings of the present invention. It is appreciated of course the transmitter and the receiver may be parts of transceivers, or transmitter-receiver combinations, at their respective locations such that bidirectional communications are provided. In the example embodiment, the transmitter includes an optical source that generates an optical communications beam, such as a laser beam or the like, on which data or information is modulated. The optical communications beam is not limited to being monochromatic or to any particular wavelength or color and may include the visible light as well as ultra violet or infra red portions of the spectrum.

In the example embodiment, the optical communications beam is directed from the transmitter to optics included in the receiver. In one embodiment, the optics direct the optical communications beam to a communications/alignmnent device, which is coupled to demodulate the optical communications beam and generate a communications signal to obtain the data or information. In one embodiment, the communications/alignment device is also integrated with optical detectors to detect a misaligned optical communications beam. In one embodiment, the communications/alignment device generates a tracking control signal or a plurality of tracking signals to maintain the alignment of the optical communications beam.

In an example embodiment, the communications/alignment device includes a semiconductor substrate having a quadrant detector and an integrated optically transparent center region such as for example a vertical waveguide structure or an integrated optical fiber. In the instance of an integrated waveguide structure, an optical fiber may be optically coupled to the waveguide structure at a backside of the semiconductor substrate, rather than mounting the optical fiber by forcing it through the die. In the example embodiment, the quadrant detector may be employed for tracking purposes while the optically transparent center region may be used communications purposes. In one embodiment, the semiconductor substrate is an integrated circuit die including for example a communications receiver circuit and/or an alignment/tracking circuit to generate a communications signal and/or a tracking control signal, respectively.

By integrating the quadrant detector for tracking purposes with the optically transparent center region in the same semiconductor substrate for communications purposes as disclosed herein, the need for a tracking detector separate from a communications detector is obviated. By eliminating the separate tracking detector, one optical path is removed, thereby reducing alignment time, system costs, maintenance costs as well as increasing reliability in accordance with the teachings of the present invention. Thus, by combining the communications and alignment/tracking aspects of one embodiment of the present invention onto a single semiconductor substrate, a filly integrated solution is provided in accordance with the teachings of the present invention.

To illustrate, FIG. 1 is a block diagram illustrating one embodiment of an optical communications system 101 in accordance with the teachings of the present invention. As shown, optical communications system 101 includes a transmitter 103 and a receiver 107. In one embodiment, transmitter 103 and receiver 107 may each be portions of respective transceivers, which provide bi-directional communications. Transmitter 103 includes an optical source 105, which generates an optical communications beam 117 on which data or information is modulated. In the illustrated embodiment, receiver 107 includes optics 109, to which optical communications beam 117 is directed. In one embodiment, optics 109 directs optical communications beam 117 to communications/alignment device 111.

In an example embodiment, optics 109 utilizes known optics elements such as for example any combination of lenses, holographic optics elements, deflectors, diffraction elements, beam splitters or the like, in accordance with the teachings of the present invention. As will be discussed in greater detail below, communications/alignment device in one embodiment includes a semiconductor substrate having an integrated optically transparent region centrally disposed among a plurality of optical detectors. In one embodiment, the plurality of optical detectors is employed to form for example a quadrant cell detector to generate a tracking control signal 115 for alignment and/or tracking purposes. In one embodiment, tracking control signal 115 is generated at speeds of approximately 100 KHz. In other embodiments, tracking control signal 115 is generated at speeds other than approximately 100 KHz.

The optically transparent center region is used to receive the optical communications beam 117 to generate a communications signal 113. In one embodiment, communications signal 113 is generated at speeds of approximately 1 GHz or more. In other embodiments, communications signal 113 is generated at speeds other than approximately 1 GHz. In one embodiment, the semiconductor substrate of communications/alignment device 111 is an integrated circuit die including a communications receiver circuit optically coupled to the optically transparent center region to generate communications signal 113. In one embodiment, the integrated circuit die of communications/alignment device 111 includes an alignment/tracking circuit 135 coupled to the plurality of optical detectors to generate tracking control signal 115.

In one embodiment, tracking control signal 115 is used to indicate the alignment of optical communications beam 117 between transmitter 103 and receiver 107. In one embodiment, tracking control signal 115 may include a plurality of individual signals used to indicate alignment of optical communications beam. In one embodiment, known techniques are used in response to tracking control signal 115 to control, for example, a steering mirror, actuated gimbal, motor, mechanical assembly, steering mechanism or the like, to adjust the orientation of optics 109 relative to optical communications beam 117 to maintain or facilitate alignment of optical communications beam 117. For instance, in one embodiment, optics 109 are moved using known techniques to maintain the alignment of optical communications beam 117. In another embodiment, optical source 105 in transmitter 103 may be moved using known techniques in response to tracking signal 115 to maintain the alignment of optical communications beam 117.

Figure 2:
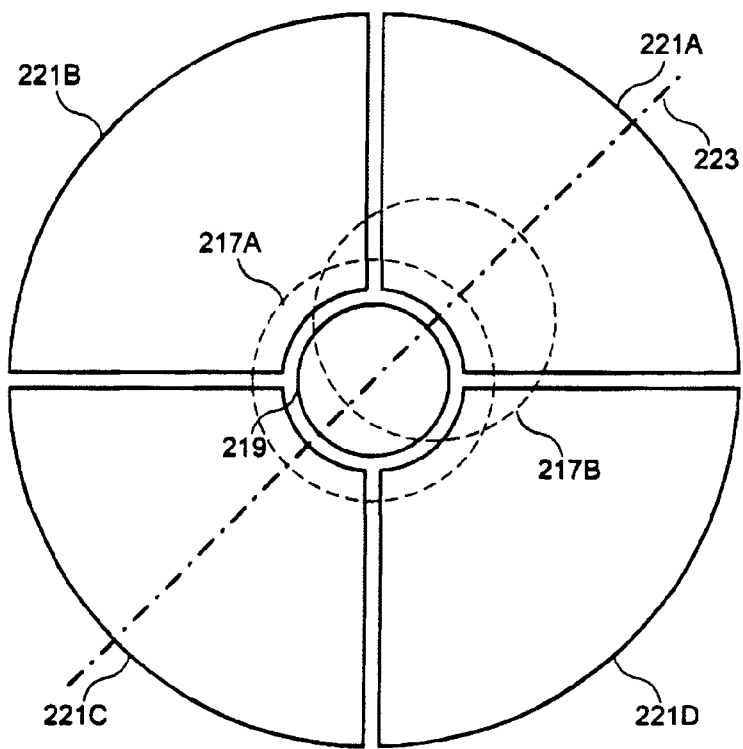
FIG. 2 is a diagram illustrating optical communications beams focused over a plurality of outer optical detectors proximate to an optically transparent center region on a surface of a semiconductor substrate of one embodiment of a communications/alignment device of an optical communications system in accordance with the teachings of the present invention.

To illustrate, FIG. 2 is a diagram that shows an optical communications beam focused on a surface of a semiconductor substrate of a communications/alignment device 211 in accordance with the teachings of the present invention. As illustrated, communications/alignment device 211 in one embodiment includes a plurality of outer optical detectors 221A, 221B, 221C and 221D arranged in a semiconductor substrate. In one embodiment, outer optical detectors 221A, 221B, 221C and 221D correspond to four quadrants of a quadrant optical detector employed for tracking purposes in accordance with the teaching of the present invention. It is appreciated that in other embodiments, there may be more than four or less than four outer optical detectors in accordance with the teachings of the present invention.

In one embodiment, an optically transparent center region 219 is integrated into the semiconductor substrate of communications/aligmnent device 211 in accordance with the teachings of the present invention. As shown, optically transparent center region 219 is centrally located relative to the plurality of outer optical detectors 221A, 221B, 221C and 221D in the semiconductor substrate. As will be discussed in greater detail below, optically transparent center region 219 in one embodiment includes an optical waveguide, an optical fiber or other suitable structure through which an optical communications beam may be directed for optical communications purposes. It is appreciated that the relative sizes of outer optical detectors 221A, 221B, 221C and 221D and optically transparent region 219 are not illustrated to scale. In one embodiment, outer detectors 221A, 221B, 221C and 221D have a field of view that is substantially greater than the field of view of optically transparent region.

In operation, FIG. 2 shows a spot 217A representing generally an area that is illuminated if optical communications beam is properly aligned. As shown, spot 217A is centered over optically transparent center region 219. Accordingly, each of the plurality of outer optical detectors 221A, 221B, 221C and 221D are illuminated substantially equally by spot 217A. In this situation, the tracking control signal 115 in FIG. 1 would indicate that the optical communications beam 117 was properly aligned between transmitter 103 and receiver 107.

In contrast, spot 217B shows one example of an area that is illuminated if optical communications beam is not properly aligned. As shown, spot 217B is not centered over optically transparent center region 219. Consequently, the efficiency of optical communications is reduced or compromised. In this situation, the plurality of outer optical detectors 221A, 2211B, 221C and 221D are not illuminated equally by spot 217B. In particular, outer optical detector 221A is illuminated more than outer optical detector 221B, 221C and 221D in the illustrated example. In this situation, the tracking control signal 115 in FIG. 1 indicates that optical communications beam 117 is not properly aligned between transmitter 103 and receiver 107 as well as the orientation of the misalignment. In response, a steering mirror, actuated gimbal, motor, mechanical assembly, steering mechanism or the like, is employed using known techniques to re-align optics 109 and/or optical source 105 such that spot 217B is moved back towards the center over optically transparent center region 219 to maintain proper alignment of optical communications beam 117 between transmitter 103 and receiver 107.

Figure 3A:
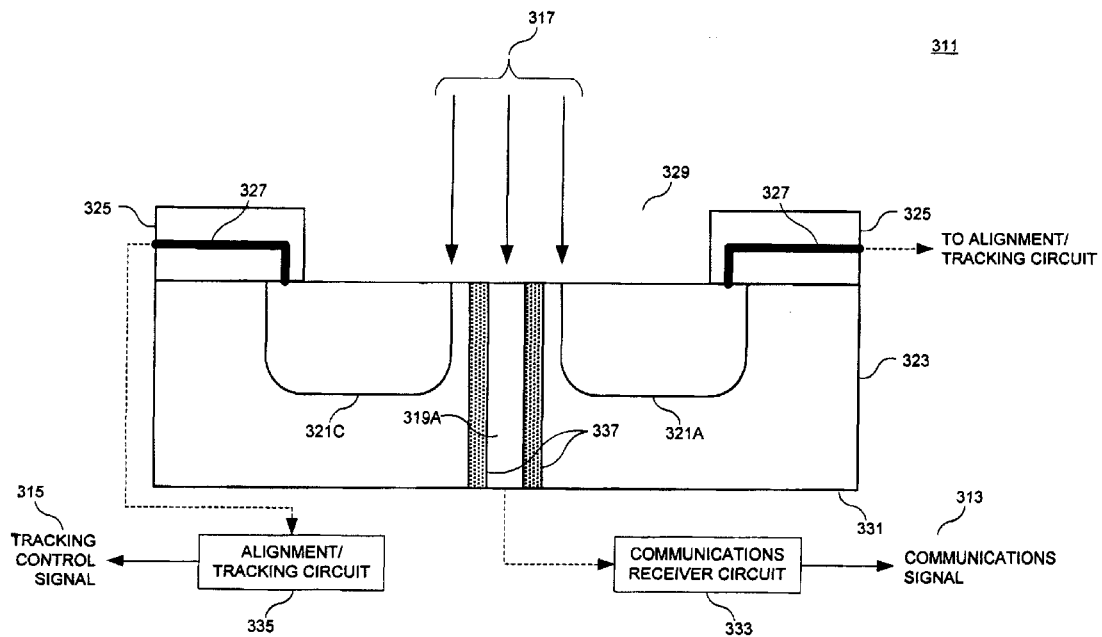
FIG. 3A is a cross-section diagram of one embodiment of a communications/alignment device of an optical communications system in accordance with the teachings of the present invention.

FIG. 3A is a cross-section diagram of one embodiment of a communications/alignment device 311 of an optical communications system in accordance with the teachings of the present invention. In the example illustrated in FIG. 3A, communications/alignment device 311 is a cross-section along for example dashed line 223 of communications/alignment device 211 FIG. 2. As illustrated in FIG. 3A, communications/alignment device 311 includes a semiconductor substrate 323 in which a plurality of outer optical detectors including for example outer optical detectors 321A and 321C are disposed. An optically transparent center region 319A is disposed in semiconductor substrate layer 323 in a central location relative to the outer optical detectors 321A and 321C. In the illustrated embodiment, an optical communications beam 317 is directed to be incident upon a front side surface 329 of semiconductor substrate 323 such that optical communications beam 317 is directed into and through optically transparent center region 319A. If optical communications beam 317 is not properly aligned or centered over optically transparent center region 319A, outer optical detectors 321A and 321C are not illuminated equally by communications beam 317 and the misalignment condition is therefore detected.

For purposes of this disclosure, the "front side" surface of a semiconductor substrate generally corresponds to a side of the semiconductor substrate on which metalization layers, conductors or the like through which electrical signals are routed in the insulating or interlayer dielectric layers of an integrated circuit die. Conversely, the "backside" surface of a semiconductor substrate generally corresponds to the side of the semiconductor substrate opposite the "front side."

In one embodiment, semiconductor substrate 323 includes a semiconductor material such as for example Silicon (Si), a silicon germanium (SiGe) alloy, a III-V semiconductor material such as for example gallium arsenide (GaAs), indium gallium arsenide (InGaAs), indium gallium arsenide phosphor (InGaAsP), or the like. In one embodiment, the type of semiconductor material used is based on the wavelength of optical communications beam 317. As is known to those skilled in the art, silicon is transparent to 1550 nanometer light. In one embodiment, germanium is used to detect 1550 nanometer light, though it has higher noise than InGaAs. However, silicon and germanium are more easily integrated into a single heterostructure than silicon and III-V alloys such as InGaAs, due to their more similar crystalline structures.

In one embodiment, optical communications beam 317 has a wavelength of approximately 1550 nanometers or 800 nanometers. In one embodiment, optical communications beam 317 includes multi-wavelength light and may be used in wave division multiplexing (WDM) applications.

In one embodiment, outer optical detectors 321A and 321C include doped regions in semiconductor substrate 323, which form diodes or photodetectors. The photodetectors can be p-doped-intrinsic-n-doped (PIN) types, avalanche photodetectors (APDs) or the like. As illustrated in FIG. 3A, electrical access is provided in one embodiment to outer optical detectors 321A and 321C through conductors 327, which are routed through an insulating layer 325 disposed proximate to the front side 329 of semiconductor substrate 323. In one embodiment, outer optical detectors 321A and 321C are coupled to alignment/tracking circuit 335 through conductors 327 and tracking control signal 315 is generated by alignment/tracking circuit 335 in response to outer optical detectors 321A and 321C. In one embodiment, insulating layer 325 and/or conductors 327 are arranged or laid out on front side 329 of semiconductor substrate 323 so as not to obstruct or interfere with incident optical communications beam 317.

In one embodiment, alignment/tracking circuit 335 includes for example electronic amplifiers and/or filters or the like and generates tracking control signal 315 to indicate alignment/tracking information. In one embodiment, outer optical detectors 321A and 321C could be used to register the average optical power sampled from incident optical communications 317. In one embodiment, outer optical detectors 321A and 321C have a bandpass filter positioned in front of them that largely passes the same wavelength of light of optical communications beam 317 while largely rejecting other background light such as for example sunlight. In one embodiment, alignment/tracking circuit 335 includes bandpass filtering circuitry to provide a similar result. In one embodiment, alignment/tracking circuit 335 is included in an integrated circuit die including semiconductor substrate 323. In another embodiment, alignment/tracking circuit 335 is included in an integrated circuit die separate from semiconductor substrate 323.

In one embodiment, optically transparent center region 319A includes an optical waveguide disposed in semiconductor substrate 323. The optical waveguide is made of an optically transparent material to communications beam 317, depending on the wavelength, such as for example insulating materials or semiconductor materials. Examples of insulating materials include oxides, nitrides or the like. As can be appreciated to those skilled in the art, semiconductor materials including for example Si, SiGe, GaAs, InGaAs, InGaAsP or the like are transparent or partially transparent to infrared light having wavelengths such as 800 or 1550 nanometers. Accordingly, in one embodiment, the optically transparent center region 319A is an optical waveguide including semiconductor material such as Si, SiGe, GaAs, InGaAs, InGaAsP or the like. In an embodiment where optically transparent center region 319A includes semiconductor material, an insulating layer is disposed between optically transparent center region 319A and semiconductor substrate layer 323.

As shown in the depicted embodiment, the optical waveguide may be considered a "vertical" optical waveguide because an axis along at least a portion of the optical waveguide of optically transparent center region 319A is orthogonal to the front side 329 of semiconductor substrate 323. Accordingly, in one embodiment, one end of optically transparent center region 319A is proximate to front side 329 such that incident optical communications beam 317 may enter the optical waveguide.

In one embodiment, the optical communications beam 317 propagates through the optical waveguide of optically transparent center region 319A and is optically coupled to be received with a communications receiver circuit 333 to generate communications signal 313. In one embodiment, an optical fiber may be mounted to backside 331 of semiconductor substrate 323 to optically couple optically transparent center region 319A to communications receiver circuit 333. In one embodiment, optically transparent center region 319A is used to route optical communications beam 317 through semiconductor substrate 323 directly to communications receiver circuit 333.

In one embodiment, optically transparent center region 319A includes layers of reflective material 337 along the sides of the optical waveguide such that optical communications beam 317 is confined to remain within the optical waveguide when propagating through optically transparent center region 319A to communications receiver circuit 333. In one embodiment, the layers of reflective material 337 include for example nitrides, oxides or the like such that total internal reflection of optical communications beam 317 occurs within optically transparent center region 319A when propagating from one end of the optical waveguide to communications receiver circuit 333. In one embodiment, layers of reflective material 337 include alternating layers of materials having different indexes of refraction to achieve total internal reflection of optical communications beam 317 while propagating through the optical waveguide of optically transparent center region 319A. In one embodiment, the layers of reflective material 337 may also serve as insulating layers between semiconductor substrate 323 and the optically transparent material of optically transparent center region 319A.

In one embodiment, communications receiver circuit 333 includes a communications detector such as for example PIN type photodetector, an APD or the like to detect optical communications beam 317. In one embodiment, communications receiver circuit 333 also includes electronic amplifiers and/or filters or the like to generate communications signal 313. In one embodiment, communications receiver circuit 333 includes bandpass filtering circuitry or a bandpass filter is placed in front of optically transparent center region to reduce the effects of background light. In one embodiment, communications receiver circuit 333 is included in an integrated circuit die including semiconductor substrate 323. In another embodiment, communications receiver circuit 333 is included in an integrated circuit die separate from semiconductor substrate 323.

Figure 3B:
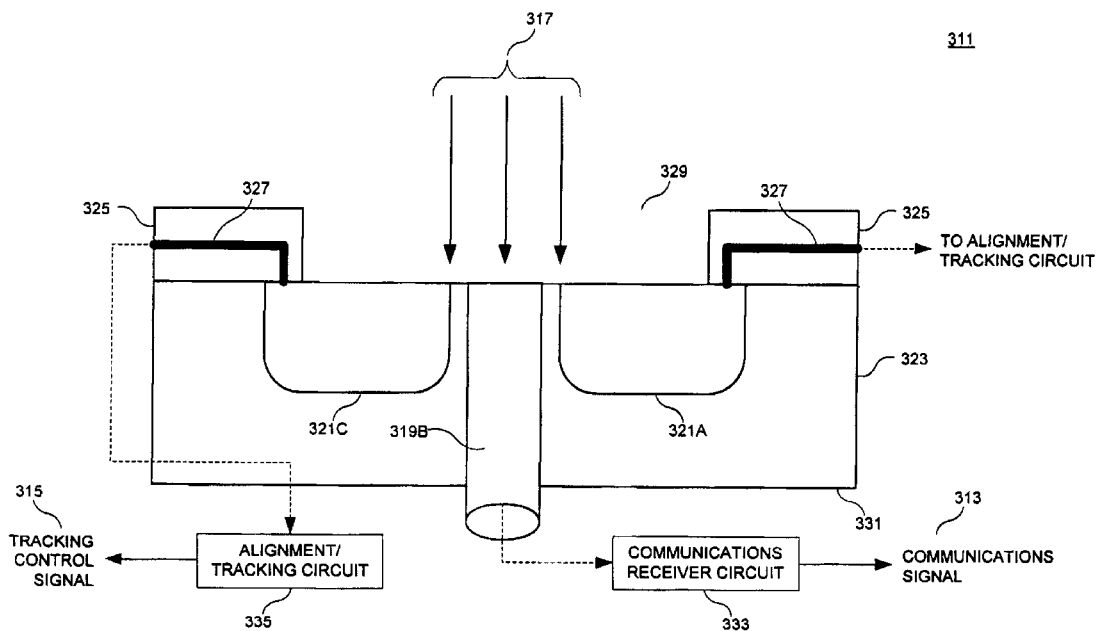
FIG. 3B is a cross-section diagram of another embodiment of a communications/alignment device of an optical communications system in accordance with the teachings of the present invention.

FIG. 3B is a cross-section diagram of another embodiment of a communications/alignment device 311 of an optical communications system in accordance with the teachings of the present invention. As can be observed, communications/alignment device 311 of FIG. 3B is similar to that described in FIG. 3A with the exception of an optical fiber being employed in optically transparent region 319B instead of an optical waveguide. In one embodiment, the optical fiber of optically transparent region 319B is mounted into semiconductor substrate such that one end of the optical fiber is proximate to the front side 329 in a central location relative to the outer optical detectors 321A and 321C. The other end of the optical fiber of optically transparent region 319B is optically coupled to communications receiver circuit 333.

It appreciated that in the embodiments described in connection with FIGS. 3A and 3B, optical communications beam 317 is directed to be incident upon front side 329. In another embodiment, optical communications beam 317 is configured to be incident upon backside 331. In such an embodiment, one end of optically transparent center region 319A or 319B is oriented such that optical communications beam 317 incident upon backside 331 enters into optically transparent center region 319A or 319B and is optically coupled to be received by communications receiver circuit 333. If optical communications beam 317 is not properly aligned, outer optical detectors 321A and 321C are not illuminated equally by optical communications beam 317 through backside 331 and the misalignment condition is therefore detected.

The above description of the illustrated embodiments of the present invention is not intended to be exhaustive or to limit the invention to the precise forms disclosed. While specific embodiments of, and examples for, the invention are described herein for illustrative purposes, various equivalent modifications, such as those described above, are possible within the scope of the present invention, as those skilled in the art having the benefit of this disclosure will recognize. The modifications can be made to the invention in light of the above detailed description. The terms used in the following claims should not be construed to limit the invention to the specific embodiments disclosed in the specification and claims. Rather, the scope of the invention is to be determined entirely by the following claims, which are to be construed in accordance with established doctrines of claim interpretation.

What is claimed is:

1. An apparatus, comprising:
   a semiconductor substrate;
   a plurality of outer optical detectors disposed in the semiconductor substrate;
   an optically transparent center region integrated in the semiconductor substrate in a central location relative to the plurality of outer optical detectors, the optically transparent center region optically coupled to receive an optical communications beam.

2. The apparatus of claim 1 further comprising a communications detector optically coupled to the optically transparent center region to generate a communications signal.

3. The apparatus of claim 2 further wherein the communications detector is disposed in the semiconductor substrate.

4. The apparatus of claim 1 further comprising a communications receiver circuit disposed in the semiconductor substrate, the communications receiver including a communications detector optically coupled to the optically transparent center region.

5. The apparatus of claim 1 further comprising an alignment circuit disposed in the semiconductor substrate, the alignment circuit coupled to the plurality of outer optical detectors to detect an alignment of the optical communications beam with the optically transparent center region.

6. The apparatus of claim 1 further comprising a tracking circuit disposed in the semiconductor substrate, the tracking circuit coupled to the plurality of outer optical detectors to generate a tracking control signal to maintain an alignment of the optical communications beam with the optically transparent center region.

7. The apparatus of claim 1 wherein the optical transparent center region includes an axis orthogonal to a surface of the semiconductor substrate.

8. The apparatus of claim 7 wherein the optical waveguide comprises an optically transparent insulating material.

9. The apparatus of claim 7 wherein the optical waveguide comprises an optically transparent semiconductor material.

10. The apparatus of claim 1 wherein the optical transparent center region comprises an optical waveguide disposed in the semiconductor substrate in the central location relative to the plurality of outer optical detectors.

11. The apparatus of claim 10 wherein the optical waveguide comprises layers of reflective material disposed in an outer region along the optical waveguide that are reflective to the optical communications beam such that the optical communications beam remains with the optical waveguide when propagating through the optical waveguide.

12. The apparatus of claim 1 wherein the optical transparent center region comprises an optical fiber disposed in the semiconductor substrate in the central location relative to the plurality of outer optical detectors.

13. The apparatus of claim 1 wherein the semiconductor substrate comprises a III-V type semiconductor material.

14. The apparatus of claim 13 wherein the semiconductor substrate comprises InGaAs.

15. The apparatus of claim 1 wherein the semiconductor substrate comprises silicon.

16. The apparatus of claim 15 wherein the semiconductor substrate comprises SiGe.

17. The apparatus of claim 1 wherein the optical communications beam comprises infrared light.

18. The apparatus of claim 17 wherein the optical communications beam comprises an optical beam having a wavelength of approximately 1550 nm.

19. The apparatus of claim 17 wherein the optical communications beam comprises an optical beam having a wavelength of approximately 800 nm.

20. The apparatus of claim 17 wherein the optical communications beam comprises a multi-wavelength optical beam.

21. A method, comprising:
   directing an optical communications beam toward a surface of a semiconductor substrate including an optically transparent center region such that a center portion of the optical communication beam is directed into the optically transparent center region of the semiconductor substrate while an outside portion of the optical communications beam is directed toward a portion of the semiconductor substrate proximate to the optically transparent center region;
   optically coupling the center portion of the optical communications beam through the optically transparent center region of the semiconductor substrate to a communications detector; and
   detecting the outside portion of the optical communications beam with a plurality of outer optical detectors disposed proximate to the surface of the semiconductor substrate proximate to the optically transparent center region.

22. The method of claim 21 further comprising generating a communications signal responsive to the communications beam optically coupled to the communications detector.

23. The method of claim 21 further comprising generating, in response to the plurality of outer optical detectors, a tracking control signal responsive to the portion of optical communications beam not directed into the optical transparent region.

24. The method of claim 23 further comprising adjusting an alignment of the optical communications beam to reduce the portion of the optical communications beam not directed into the optical transparent region responsive to the tracking control signals.

25. The method of claim of 21 wherein optically coupling the optical communications beam through the optically transparent center region through the semiconductor substrate to the communications detector comprises optically coupling the optical communications beam to the communications detector through the semiconductor substrate with an optical waveguide disposed in the semiconductor substrate.

26. The method of claim of 21 wherein optically coupling the optical communications beam through the optically transparent center region through the semiconductor substrate to the communications detector comprises confining the optical communications beam to remain within the optically transparent center region with layers of reflective material disposed in an outer region along the optically transparent center region that are reflective to the optical communications beam.

27. The method of claim of 21 wherein optically coupling the optical communications beam through the optically transparent center region through the semiconductor substrate to the communications detector comprises optically coupling the optical communications beam to the communications detector through the semiconductor substrate with an optical fiber disposed in the semiconductor substrate.

28. The method of claim 21 wherein the optical communications beam is directed toward a front side surface of the semiconductor substrate.

29. The method of claim 21 wherein the optical communications beam is directed toward a backside surface of the semiconductor substrate.

30. A system, comprising:
   optics optically coupled to receive an optical communications beam, the optics to direct the optical communications beam to a semiconductor substrate;
   an optically transparent center region integrated into the semiconductor substrate, the optically transparent center region optically coupled to receive the optical communications beam at a surface of the semiconductor substrate;
   a plurality of outer optical detectors disposed within a region surrounding the optically transparent center region proximate to the surface of the semiconductor substrate;
   a communications receiver circuit optically coupled to the optically transparent center region to receive the optical communications beam through the semiconductor substrate to generate a communications signal in response to the optical communications beam; and
   an alignment circuit coupled to the plurality of outer optical detectors to detect a portion of the optical communications beam optically coupled to the plurality of outer optical detectors.

31. The system of claim 30 wherein the alignment circuit comprises a tracking circuit to generate a tracking control signal used to reduce the portion of the optical communications beam optically coupled to the plurality of outer optical detectors.

32. The system of claim 30 wherein the optically transparent center region comprises an optical waveguide disposed in the semiconductor substrate, the optical waveguide having a first end disposed proximate to the surface of the semiconductor substrate and a second end optically coupled to the communications receiver circuit.

33. The system of claim 30 wherein the optically transparent center region comprises an optical fiber disposed in the semiconductor substrate, the optical fiber having a first end disposed proximate to the surface of the semiconductor substrate and a second end optically coupled to the communications receiver circuit.

34. The system of claim 30 wherein the surface of the semiconductor substrate comprises a front side surface of the semiconductor substrate.

35. The system of claim 30 wherein the surface of the semiconductor substrate comprises a backside surface of the semiconductor substrate.

36. The system of claim 30 wherein the semiconductor substrate comprises a III-V semiconductor material.

37. The system of claim 30 wherein the semiconductor substrate comprises a silicon germanium alloy.

\* \* \* \* \*

UNITED STATES PATENT AND TRADEMARK OFFICE
CERTIFICATE OF CORRECTION

PATENT NO. : 6,493,490 B1
DATED : December 10, 2002
INVENTOR(S) : Steiger

It is certified that error appears in the above-identified patent and that said Letters Patent is hereby corrected as shown below:

<u>Title page,</u>
Item [54], Title, please replace the current title with -- METHOD AND APPARATUS FOR RECEIVING AND ALIGNING AN OPTICAL COMMUNICATIONS BEAM WITH AN INTEGRATED STRUCTURE --.

Signed and Sealed this

Eighth Day of June, 2004

JON W. DUDAS
*Acting Director of the United States Patent and Trademark Office*